United States Patent
Raga

(10) Patent No.: US 6,770,112 B2
(45) Date of Patent: Aug. 3, 2004

(54) PROCESS FOR TRANSFORMING THE RESIDUES LEFT AFTER TANNING WITHOUT CHROMING AND THE PRODUCTS THEREBY OBTAINED

(76) Inventor: Alberto Pons Raga, Pintor Joan Miro, 13-Bajo Valencia, 46017 Valencia (ES)

( * ) Notice: Subject to any disclaimer, the term of this patent is extended or adjusted under 35 U.S.C. 154(b) by 299 days.

(21) Appl. No.: 10/100,570

(22) Filed: Mar. 15, 2002

(65) Prior Publication Data

US 2003/0005733 A1 Jan. 9, 2003

(51) Int. Cl.[7] .................................................. C05F 1/00
(52) U.S. Cl. .............................................. 71/18; 71/15
(58) Field of Search ...................................... 71/15, 18

(56) References Cited

U.S. PATENT DOCUMENTS

| | | | |
|---|---|---|---|
| 1,830,921 A | * 11/1931 | Michelman | ................ 423/358 |
| 1,963,909 A | * 6/1934 | Walter et al. | ................... 71/18 |
| 3,997,290 A | * 12/1976 | DEL Cueto | .................. 8/94.16 |
| 4,483,829 A | * 11/1984 | Guardini | ...................... 423/55 |
| 5,094,946 A | * 3/1992 | Taylor et al. | .............. 435/68.1 |
| 5,271,912 A | * 12/1993 | Taylor et al. | .................. 423/55 |
| 6,440,692 B1 | * 8/2002 | Koyama et al. | ........... 435/68.1 |

FOREIGN PATENT DOCUMENTS

RU    1103384    * 10/1993

* cited by examiner

*Primary Examiner*—C. Sayala
(74) *Attorney, Agent, or Firm*—J. Sanchelima; A. Bordas

(57) ABSTRACT

Process for transforming the residues left after tanning without chroming and the products thereby obtained, based on the process of homogenizing (2) the raw material (1), which consists of the leftovers of the tanning industry, such as remnants of skin with hair, trimmings, suede, etc. A mineral acid (3) is added to the mixture, as are semi-metals and metals (4) with a valency of 0, phenol and phenolate (15). The mixture is put in a pressure vessel (5) and is filtered (6) to separate the liquid portion (7) and the solid part (9), which can be neutralized (10) or treated with micro organisms (13).

Figure 1:
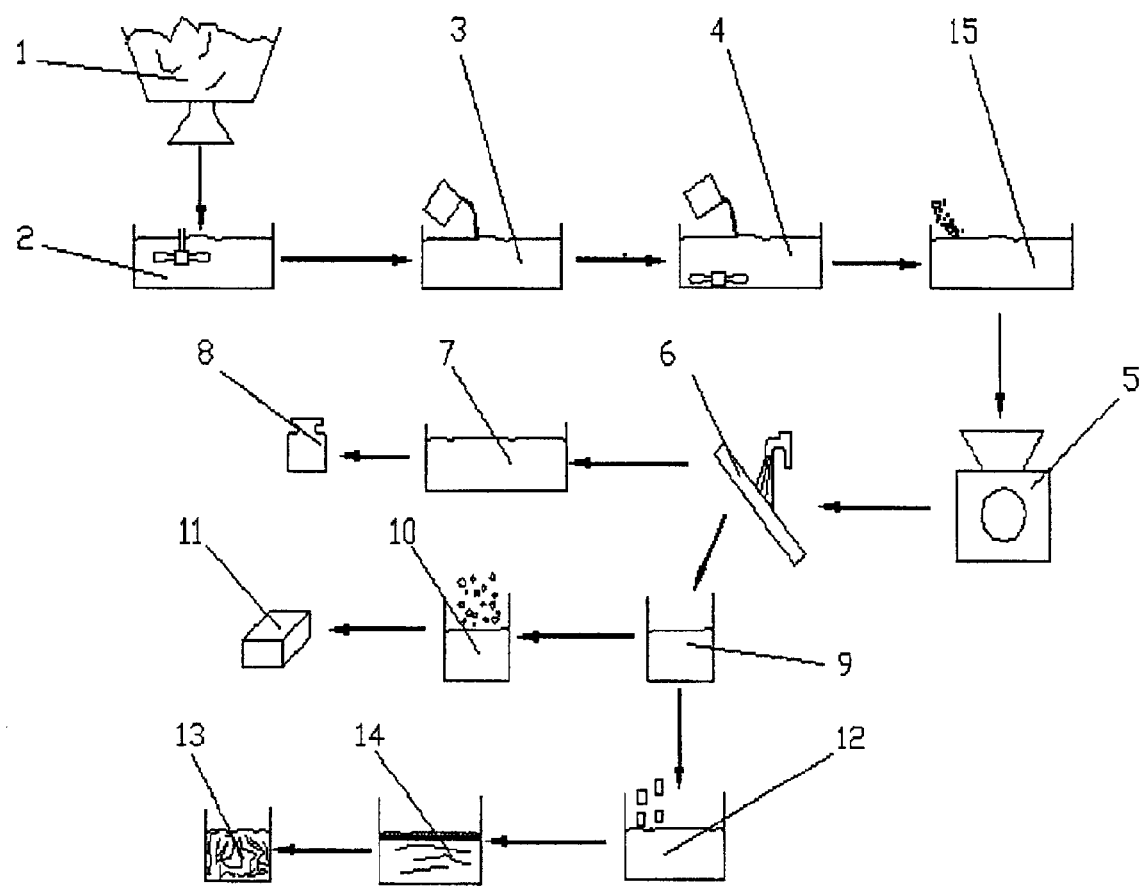

This process is intended to be used in the leather and fur industry as well as in agriculture.

14 Claims, 1 Drawing Sheet

PROCESS FOR TRANSFORMING THE RESIDUES LEFT AFTER TANNING WITHOUT CHROMING AND THE PRODUCTS THEREBY OBTAINED

This invention refers to a process for transforming the residues left after tanning without chroming and the products thereby obtained, thus allowing waste materials to be recycled. These waste materials include off cuts from skins used in the leather and fur industry, which have previously been sulphured and treated with salt and lime. The process allows products to be obtained from the trimmings of these skins which can be used in agriculture, such as fertilisers, manure and the like, thereby preventing an increase in the volume of rubbish disposed of in rubbish dumps and waste incinerators.

At present, after killing and skinning the animal, and before starting the tanning process, the untreated skins are cured by salting and drying them. The most commonly used curing methods involve the use of salt. The cured skins are soaked in fresh water to remove the salt, blood and dirt and to rehydrate them after the curing process. To remove the hair, the skins are immersed in a solution of lime and water with a small amount of sodium sulphide.

Once this point has been reached, before chrome tanning begins, the skin is cut, leaving certain parts as waste, such as the outline, edges and other parts which are difficult to use in the leather industry. Neither can these trimmings be used to make meal since they have been chemically treated and are thus not suitable for such a use. They are therefore incinerated, or they are thrown away in the rubbish.

These products smell bad in the rubbish dumps and ferment, releasing unpleasant outflows, in addition to increasing the volume of rubbish. Another possible solution to dispose of these industrial by-products is to burn them, but this is an expensive process, which also pollutes.

With the process for transforming the residues left after tanning without chroming and the product thereby obtained, the object of this invention, the aim is to avoid all these drawbacks. In order to do so, the mixture is homogenised and ph modifiers additives, such as an organic acid, semi-metals and noble heavy metals are added. The mixture is put in a pressure vessel and is passed through a filter, the liquid being bottled as an agricultural fertiliser and the solid material being made into peat. In this way 100% of the waste material from trimming the skins may be recycled.

The advantages are twofold. On the one hand, the waste products are not disposed of in rubbish dumps, thus eliminating the corresponding problems such as unpleasant smells, rotting, health risks etc., and not increasing the volume of the areas used for rubbish dumps. At the same time, the costs of incinerating the material are also avoided.

On the other hand, the residual products obtained as a result of the residues being processed using the procedure described in this report, may be used in agriculture, either as products to regenerate the soil, fertilisers etc, or as peat, depending on whether it is the liquid collected after filtering or the solid particles which the filter retains.

Transforming these residual products in active elements is of great interest in terms of their properties as activators in the process of biological fermentation, and therefore they are of great value as activators and soil regenerators used in agriculture and gardening.

In order to allow for a better understanding of this descriptive report, a series of illustrative, non-restricting diagrams are attached. These form an integral part of the afore-mentioned report. The following elements have been illustrated:

FIG. 1. Diagram of the process for transforming the residues left after tanning without chroming, the object of this invention.

The process begins with the stored raw material (1), which is taken and homogenised (2). A ph modifier (3) as mineral acid or base, and a catalyzer (4) as a semi-metal or noble heavy metal with a valency of 0 are added to the mixture; and/or an additive in the form of phenol or phenolate (15) is added. The mixture is then put in a pressure vessel (5) and passed through a filter (6). From this point onwards there is a liquid portion (7), which is bottled (8), and the residue or solid part, which is left over (9). This solid part can be treated in two ways. One way is to neutralise (10) the solid, which transforms the grease into a soapy manure. The other way is to take the solid component (9), neutralise it (12) and ferment it with a micro organism (13), which converts it into peat (14).

The raw material (1) consists essentially of the leftovers of the raw material used in the leather and fur industry, that is to say residues of hair, skin, trimmings, collagen, suede, which is the same size as the leather skin, etc., all of which are obtained from the trimmings of the skin once it has been sulphured and treated with salt and lime, but before the treatment with chrome. Since these materials can no longer be used in the production of meal, they can only be got rid of by throwing them away or by burning them.

All this material is ground (2) and mixed long enough to ensure that it is a consistent, homogeneous amalgam, which becomes a paste. A ph modifier (3) is added to the mass, which may be a mineral acid or mineral base, in a percentage of between 0.01 and 5% of the total mass in order to ensure chemical hydrolysis. At the same time the catalyst (4) is added. This consists of semi-metals and metals from group VII of the periodic table with a valency of 0, and noble heavy metals or metals with a complete electronic D-shell, also with a valency of 0, in a percentage of between 0.001 and 1% of the total mass, depending on the element to be added at this stage.

A third additive (15) is added to the mixture, which consists of phenol or phenolate with a molecular weight of less than 450, in amounts, which can vary between 0.001 and 1% of the total mass.

Once the resultant mass has been mixed in a pressure vessel (5), it is heat treated with valves open to steam at a temperature of between 145° and 165° C. for a minimum of 2 hours. The main difference between this method and the methods currently in use is this point, since it involves thermo catalysing without the addition of mineral acids, in which case the thermo-catalytic reaction tends to have an acidic pH value.

The result of the process carried out in the pressure vessel is passed through a filter (6), which enables the separation of a liquid portion (7), approximately 90% of the mass, and a solid part (9), approximately 10% of the mass. This separation of solids and liquids may be carried out by any means available in the market, such as centrifugation, decantation, filtration, etc. The liquid portion (7) is ready for bottling (8) and commercialising as liquid fertiliser with active biological constituents, rich in amino acids, which supply nutrients and activate the micro organisms of the soil.

The treatment of the solid part (9) of the filtered element (6), which in turn contains biological elements which are ideal as a means of adding micro-organisms to the soil, consists of neutralising the solids with calcic hydroxide and magnesium oxide until they have a pH value of between 7.0 and 7.5. Once neutralised, the solids are subjected to a process of fermentation (13) through neutralisation (12), by means of the addition of a bacterial micro-organism, preferably from the azotobacter and heterofermentative lactobacilli family, keeping it fermenting in a revolving hopper for a minimum of 15 days, which transforms the solid mass into usable peat.

With the process which is the object of this invention, the aim is to obtain a high performance fertilising product for crop-growing soil from a waste product which until now has been useless, such as the leftovers of the leather and fur industry. The end product is also protected, as are the procedures developed, which, based on the main process, provide a solution to the use of sub products obtained from the process.

The liquid fertiliser obtained is a means of revitalising soil used for agriculture and is far superior to the organic liquid products which are currently available, since its source does not contain carbohydrates and therefore does not favour the proliferation of fungicidal diseases of the vegetable kingdom and it provides those elements which are required for life which allow the rapid regeneration of synergic and symbiotic bacterial micro-organisms of plants.

In the same way, it allows industrial waste products, which are extremely stable due to their sulfonation to be cheaply regenerated.

Once the nature of this invention has been sufficiently described, as well as the practical use of the same, the only thing left to mention is that both its form as well as the elements used and the performance of the same are open to modifications provided that they do not substantially affect the characteristics which are set out in the claims below.

What is claimed is:

1. A process for transforming the residues left after tanning without chroming comprising the steps of:
   A) preparing off cuts of raw material before they are treated with chrome;
   B) homogenizing said residues forming a mass;
   C) adding a PH modifier to said mass;
   D) adding a catalyst to said mass;
   E) adding an effective amount of phenol or phenolate with a molecular weight of less than 450 to said mass;
   F) placing said mass in a pressurized vessel with its valve open to steam; and
   G) filtering said mass thereby separating the liquid and solid portions, said resulting liquid portion having a substantial amount of amino acids that are suitable for use as fertilizers and said solid portion being neutralized and the resulting grease transformed into soapy manure.

2. The process set forth in claim 1 wherein said pH modifier is a mineral add.

3. The process set forth in claim 1 wherein said pH modifier is a mineral base.

4. The process set forth in claim 1 wherein the concentration of said pH modifier is between 0.01 and 5% of the weight of said mass to ensure chemical hydrolysis.

5. The process set forth in claim 1 wherein said catalyst added to said mass is from a group consisting of metals and semi metals from group VII of the periodic table with a valency of zero and of noble heavy metals of metals with a complete electronic D-shell with a valency of zero.

6. The process set forth in claim 1 wherein said effective amount of phenol or phenolate is added to the mass in an amount between 0.001 percent and 1 percent of the weight of said mass.

7. The process set forth in claim 1 wherein said pressurized vessel with its valve open to steam is kept at a temperature between 145 and 165 degrees Celsius for at least two hours thereby causing the reaction to tend to have an acidic pH.

8. A process for transforming the residues left after tanning without chroming comprising the steps of:
   A) preparing off cuts of raw material before they are treated with chrome;
   B) homogenizing said residues forming a mass;
   C) adding a PH modifier to said mass;
   D) adding a catalyst to said mass;
   E) adding an effective amount of phenol or phenolate with a molecular weight of less than 450 to said mass;
   F) placing said mass in a pressurized vessel with its valve open to steam; and
   G) filtering said mass thereby separating the liquid and solid portions, said resulting liquid portion having a substantial amount of amino acids that are suitable for use as fertilizers and said solid portion being neutralized hind fermented with micro organisms that convert said solid portion into peat.

9. The process set forth in claim 8 wherein said pH modifier is a mineral acid.

10. The process set forth in claim 8 wherein said pH modifier is a mineral base.

11. The process set forth in claim 8 wherein the concentration of said pH modifier is between 0.01 and 5 percent of the weight of said mass to ensure chemical hydrolysis.

12. The process set forth in claim 8 wherein said catalyst added to said mass is from a group consisting of metals and semi metals from group VII of the periodic table with a valency of zero and of noble heavy metals of metals with a complete electronic D-shell with a valency of zero.

13. The process set forth in claim 8 wherein said effective amount of phenol or phenolate is added to the mass in an amount between 0.001 percent and 1 percent of the weight of said mass.

14. The process set forth in claim 8 wherein said pressurized vessel with its valve open to steam is kept at a temperature between 145 and 165 degrees Celsius for at least two hours thereby causing the reaction to tend to have an acidic pH.

* * * * *